May 19, 1953 S. E. GAMAREKIAN 2,639,209
RECORDING APPARATUS
Filed Sept. 29, 1949
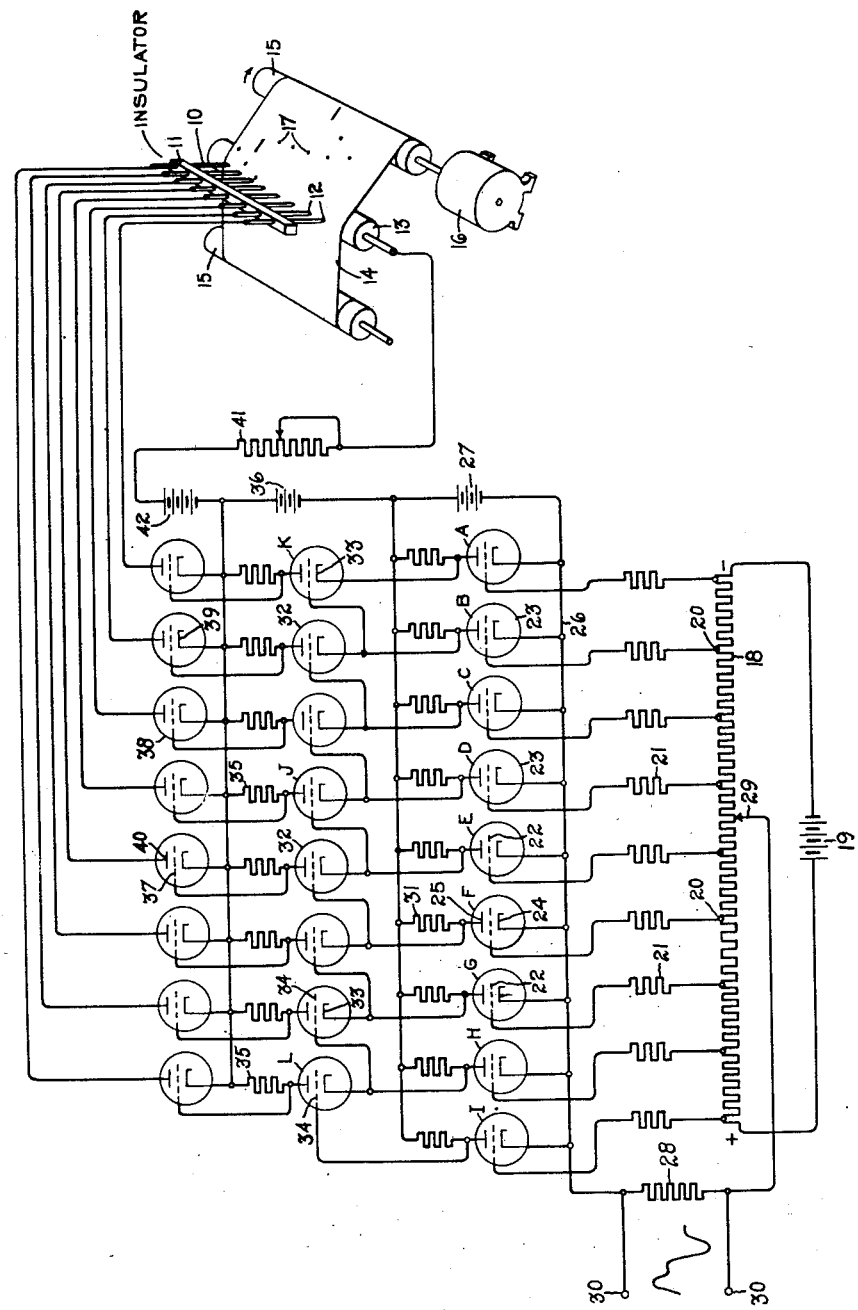
Inventor:
Sooren E. Gamarekian,
by Paul A. Frank
His Attorney, Patented May 19, 1953

2,639,209

UNITED STATES PATENT OFFICE 2,639,209

RECORDING APPARATUS

Sooren E. Gamarekian, Schenectady, N. Y., assignor to General Electric Company, a corporation of New York Application September 29, 1949, Serial No. 118,532

3 Claims. (Cl. 346—33)

My invention relates to recording apparatus and more particularly to recording apparatus which employs an electrical current flow or impulse as the recording medium.

Recording apparatus of this current impulse type, usually referred to as a "spark recorder," commonly utilizes facsimile technique. Periodic pulses of current, which flow from a rotating helical conductor to an adjacent printing bar are employed to produce a series of dots representing an applied signal voltage upon a moving sheet of electro-sensitive material fed between the helical conductor and the printing bar. The voltage to be recorded is sampled during each revolution of the helical conductor and is converted through a voltage-to-time conversion circuit into current pulses occurring at intervals of time after the beginning of each revolution which vary in accordance with the amplitude of the sampled voltage. It will be appreciated that the accuracy of such recording apparatus is, therefore, dependent upon the accuracy and speed of response of such voltage-to-time conversion circuits, and that any non-linearities or uncompensated time delays in the circuit will produce an erroneous record.

Furthermore, since only one dot or mark is printed on the electro-sensitive material during each revolution of the helical conductor, the recording is intermittent and a very rapid signal voltage fluctuation which has a duration less than the time of one revolution will not be recorded. It is also apparent that the frequency range of such recorders is limited by the speed of rotation of the recording helical member since an entire cycle of high frequency voltage may pass before one revolution of the helical member is accomplished.

Accordingly, one of the principal objects of my invention is to provide a current pulse recorder which eliminates the necessity of a voltage-to-time conversion circuit and which directly and instantaneously records a signal voltage.

Another object of my invention is to provide a recording apparatus of the electric current flow type whose recording is continuous rather than intermittent and which therefore can reveal the entire applied voltage function including rapid voltage transients.

A further object of my invention is to provide a recording apparatus of the current flow type which can easily be adjusted to record only a particular desired portion of a signal voltage wave.

A further object is to provide a recorder suitable for use with alternating signal voltages of relatively high frequency.

A still further specific object of my invention is to provide an improved voltage level switching network which produces a separate output pulse or flow of electrical energy upon the application of various predetermined signal voltage levels.

In general, my new and improved recorder comprises a series or array of recording electrodes supported in a position continguous to an electrically conductive printing member and connected to a voltage level switching network which produces a flow of electrical current between the printing member and a selected one of the recording electrodes in response to the instantaneous amplitude level of a signal voltage. Each electrode is connected to be energized only upon the occurrence of a particular input voltage level and is linearly arranged with respect to the other recording electrodes in the array so that successive electrodes represent successive input voltage levels. A sheet of electro-sensitive recording material is fed intermediate the conductive printing member and the array of recording electrodes with the result that a series of marks representing the instantaneous input voltage levels are directly printed upon the recording material by the passage of electric currents therethrough.

The novel features which I believe to be characterisic of my invention are set forth with particularity in the appended claims. My invention itself, however, together with further objects and advantages thereof can best be understood by reference to the following description taken in connection with the accompanying drawing in which the sole figure is a schematic diagram of an electrical circuit and recording system embodying my invention.

Referring to the drawing, I have shown my invention in one form as comprising a series or array of recording electrodes 10 supported in linear spaced relation by an insulating bar 11 through which the electrodes 10 are inserted. The tips 12 of the electrodes 10 are maintained in close proximity to the surface of an electrically conductive printing member 13, and a sheet of electro-sensitive recording material 14 is fed intermediate the electrodes 10 and the printing member 13 by such means as rollers 15 driven at a constant speed by motor 16. In order to enable the recording material 14 to be fed at a high velocity without the danger of tearing or stretching due to excessive friction, the printing member 13 preferably comprises a rotatable metal drum which is axially positioned with respect to the electrodes 10, as illustrated, although many other configurations, such as a simple metallic plate, may alternatively be provided.

It will be appreciated that a flow of electric current from the printing member 13 to any one of the electrodes 10 will produce a mark upon the electro-sensitive material which is dependent upon the position of the electrode concerned. If the current flow is of extremely short duration, a dot results; but if the current flow occurs throughout a longer interval of time, a line is produced whose length and direction is determined by the movement of the recording material 14 with respect to the particular electrode. Therefore, by effecting a flow of current between the common printing member 13 and a particular electrode 10 upon the occurrence of a signal voltage of predetermined amplitude only, a record of this event is accomplished. Furthermore, by causing each successively positioned electrode in the array to be energized at signal voltage levels increasing by voltage amplitude increments corresponding to the spacing between the electrodes, a conventional voltage amplitude versus time curve, representing an input voltage function, may be recorded by a series of marks, as illustrated by the typical recorded voltage function 17.

In order to produce a current impulse from the common printing member 13 to a particular electrode 10 whenever the amplitude of a voltage to be recorded reaches a predetermined voltage level, I provide a voltage level switching network which includes a means for producing a voltage gradient, such as a multi-tapped potentiometer 18 connected as a voltage dividing network from the positive to the negative terminals of a source of unidirectional voltage, such as battery 19. It will be noted that the number of tapped points 20 along the length of the potentiometer 18 is one more than the number of recording electrodes 10 in the array, and that these tapped points 20 are preferably equally spaced as are the electrodes 10. The voltage at each of these tapped points 20 is supplied through a separate grid current limiting resistance 21 to a control electrode 22 of an associated electric discharge device 23, preferably of the triode vacuum tube type which also includes a cathode 24 and an anode 25, as indicated. All of the grid current limiting resistances 21 and all of the discharge devices 23 are preferably of substantially identical construction; and all of the cathodes 24 of these discharge devices 23 are directly interconnected by a common conductor 26 to the negative terminal of a second source of unidirectional potential, such as a battery 27. The cathodes 24 are also connected to one end of a common cathode resistance 28, whose other end is connected through a movable arm 29 of the potentiometer 18 to a determinable voltage point along the voltage gradient produced by the potentiometer 18.

The input signal voltage to be recorded is supplied to the network across the cathode resistance 28 through input terminal leads 30. Since all of the cathodes 24 of the devices 23 are connected through common resistance 28 to a common tapped point along the length of potentiometer 18, while the grids 22 of these devices 23 are connected to different consecutively-spaced points 20 thereupon, it will be appreciated that the bias voltage on each of the discharge devices 23 increases by increments proportional to the spacing between each tapped point 20 and has an absolute magnitude which is dependent upon the position of the movable arm 29. The anodes 25 of discharge devices 23 are directly connected through separate, but identical, load resistances 31 to the positive terminal of the unidirectional voltage source represented by battery 27.

The discharge devices 23 and their associated circuits described above constitute what may be termed a "voltage level selection circuit." This voltage level selection circuit functions to produce an output voltage differential between only one pair of adjacently biased discharge devices 23. The particular pair of devices 23 which contains this output voltage differential is, in turn, dependent upon the amplitude level of the input signal, as will be more fully explained hereinafter.

In order to utilize a voltage differential output of this voltage level selection circuit to energize a proper recording electrode 10, I employ a second array of electric discharge devices 32, such as triode vacuum tubes, one less in number than the number of taps 20 and therefore equal in number to the number of recording electrodes 10, and connected as channel selecting or "gating" stages. Each discharge device 23 of the voltage level selection circuit, with the exception of the most negatively and most positively biased devices 23, has its anode 25 directly connected both to a cathode 33 of one of the gating devices 32 and to a control electrode 34 of a successively positioned gating device 32, as indicated. The anode of the most negatively biased discharge device, designated by the letter A, is directly connected only to the cathode of the gating device 32 which is at one end of the array of gating devices, and designated by the letter K, while the anode of the most positively biased discharge device, designated by the letter I, is directly connected only to the control electrode 34 of the gating device 32 located at the other end of the array and designated by the letter L. It is apparent that each of the gating devices 32 are, therefore, biased by the anode voltage difference existing between one pair of adjacent voltage level selection devices 23.

The above-described amplitude level switching network including the voltage level selection circuit and the circuitry associated with electron discharge devices A through K forms a portion of the subject matter of my divisional application, Ser. No. 276,198, filed March 12, 1952, entitled, "Voltage Level Switching Network," and assigned to the present assignee.

The anodes of all of these gating devices 32 are directly connected through identical load resistances 35 to a point of higher positive potential than the anode potential supplied to the voltage level selection circuit, such as to the positive terminal of a battery 36, whose negative terminal is connected to the positive terminal of the battery 27. The output of each of the gating stages is taken from the anode of the associated triode discharge device 32 and directly connected to a control electrode 37 of a corresponding one of an array of current supplying electric discharge devices 38 connected to form current supplying channels for the recording electrodes 10, as will be more fully explained hereinafter. The cathodes 39 of these current supplying devices 38 are all directly connected to the same source of positive potential as that which supplies the anode voltage to the gating circuit. As a result, it is apparent that each of the current supplying devices 38 is biased by the output voltage appearing across the load resistance 35 of an associated gating stage.

The current supplying devices 38 are arranged in sequence so that each device is controlled by a correspondingly and sequentially arranged gating device 32 which, in turn, is biased by the anode voltage difference between adjacent voltage level selection stages. An anode 40 of each of these current supplying devices 38 is directly connected to a correspondingly positioned electrode in the linear array of recording electrodes, so that each electrode 10 is energized by a separate channel comprising a current supplying stage corresponding to one of the current supplying devices 38.

In order to complete the anode-to-cathode circuit of each of these current supplying devices 38, the rotatable printing drum 13, which is in close proximity to all of the electrodes 10, is connected through a common current limiting resistance 41 to a source of high positive potential with reference to the cathodes 39, such as to the positive terminal of a battery 42 whose negative terminal is connected to the cathodes 39 as well as to the positive terminal of the anode voltage supply 36 for the gating circuits. The resistance 41 is preferably of the variable resistance type in order to provide a means for controlling the anode-to-cathode current of the current supplying devices 38.

In order to understand the operation of my invention, it is deemed advisable to consider the condition of the voltage level selection circuit when no input signal voltage is applied. Since each of the control electrodes 22 of the discharge devices 23 are connected to a different voltage point along the voltage gradient provided by the potentiometer 18, while the cathodes 24 of these devices 23 are all connected to a common voltage point thereupon, it will be appreciated that each of the discharge devices 23 is biased in sequentially increasing increments through a voltage range extending from a highly negative bias to a highly positive bias. An adjacent series of the discharge devices 23 such as the devices designated by the letters A, B, C and D are therefore biased beyond cut-off and maintained in a non-conducting state, while the remainder of the devices such as the series of devices designated by the letters E, F, G, H and I are biased above cut-off and therefore are conducting. As a consequence the voltage at the anodes of the non-conducting devices A through D is relatively high and substantially equal to the voltage at the positive terminal of battery 27. While the voltage at the anodes of the conducting devices E through I is relatively low and substantially equal to the voltage at the negative terminal of the battery 27. The only pair of adjacently biased devices 23 which have a large anode voltage differential are, therefore, the devices D and E. It is evident from this example that there can be only one pair of adjacently biased voltage level selection devices 23 which can have an anode voltage differential at any particular instant of time. The particular pair of adjacent devices 23 which exhibit this anode voltage differential is dependent upon the position of the movable arm 28 of the potentiometer 18, the magnitude of the biasing increments between the devices 23, and the anode current cut-off point of the particular devices 23 employed. Electron discharge devices having sharp cut-off characteristics are, of course, to be preferred for these stages.

Since each of the channel selecting or gating devices 32 is biased by the anode voltage differential existing between a different pair of adjacent voltage level selection devices 23, only one of the gating devices 32 is non-conducting while all of the remaining gating tubes are conducting. If, for example, the anode voltage differential exists between tubes D and E, then the gating device 32 indicated by the letter J is made non-conducting, since the high anode voltage of the voltage level selecting device D is applied to cathode 33 of gating device J, while the low anode voltage of voltage level selecting device E is applied to the control electrode of this gating device J. Each of the remaining gating devices have their cathodes and control electrodes at the same potential with the result that these latter gating devices are all conducting.

If the movable arm 29 of potentiometer 18 is set at a particular reference or operating point and a signal voltage is applied across resistance 28 through the input terminals 30, the biasing voltage which exists between the cathodes 24 and the control electrodes 22 of all of the voltage level selection devices 23 varies accordingly. This bias voltage variation causes a corresponding shift in the point of cross-over from conduction to non-conduction within the array of voltage level separation devices 23. If, as in the previous example, the operating point is adjusted so that, in the absence of a signal voltage, the conduction to non-conduction cross-over within the array occurs between the tubes D and E, then a positive-going signal voltage increases the cathode voltage and causes the more positively biased devices, such as the discharge devices E through I do become non-conducting successively. As a result the point of cross-over from conduction to non-conduction shifts towards the devices at the more positively biased end of the array. Conversely, a negative-going signal voltage causes this point of conduction to non-conduction crossover to shift toward the more negatively biased devices in the array.

The output voltage of each of the gating devices 32, developed across their respective load resistances 35, is applied as a biasing voltage to a corresponding one of the array of current supplying devices 38. The magnitude of the voltage drop produced across each of the load resistances 35 when an associated gating device 32 conducts is sufficient to bias the corresponding current supplying device 38 below cut-off. As a consequence, all of the current supplying devices 38 are maintained in a non-conducting state except the one which is biased by the particular gating device which, in turn, is cut off by the anode differential voltage between an adjacent pair of voltage level selection stages. The conduction of any of the current supplying devices 38 will effect a current flow from the electrode connected to the anode of that particular device through the electrosensitive material 14 to the printing member 13. The magnitude of this current flow, and therefore the intensity of the resultant mark upon the electrosensitive material, can be controlled by an adjustment of variable resistance 41.

It will therefore be appreciated that upon the application of a signal voltage a mark will be printed upon the recording material, the position of the mark along the transverse dimension of the material being a direct function of the amplitude of the signal voltage. Since the recording material is propelled at a constant speed, an input voltage function will produce a series of marks spread along the recording material with reference to a time axis to form a trace representative of the input voltage function.

Although I have shown an array containing only eight electrodes energized by eight current supplying channels, it is to be understood that any number of electrodes and energizing channels may be included in order to provide a more or less complete trace having a wider or narrower range of deviation as desired. Furthermore, the spacing between the tap points 20 can be made closer or wider in order to provide a greater or lesser sensitivity to variations in the voltage level of an input signal. In addition, a particular wave portion of the input voltage function can be recorded by merely preamplifying the input voltage and by adjusting the movable arm 29 of the potentiometer 18 until the operating point of the voltage level selection circuit is at the voltage center of the desired wave portion.

It is to be understood that while I have shown a particular embodiment of my invention, many modifications can be made, and I, therefore, intend by the appended claims to cover all such modifications as fall within the true spirit and scope of my invention.

What I claim as new and desire to secure by Letters Patent of the United States is:

1. Apparatus for recording high frequency voltage variations comprising an electrically conductive printing member, an array of electrodes having tips in close proximity with linearly spaced points on said member, means for feeding a sheet of electrosensitive recording material between said member and said electrode tips, an array of voltage amplifier stages each constructed to provide an output voltage of a first similar magnitude when operative and of a second similar magnitude when inoperative, means for varying the ratio of an adjacent series of operative stages to an adjacent series of inoperative stages in accord with instantaneous amplitude level variations of an input voltage, and separate control means connected in circuit with said printing member and each electrode, each control means being connected to be energized by a difference in voltage between the output voltages of a respective adjacent pair of amplifier stages.

2. Apparatus for recording high frequency voltage variations comprising an electrically conductive printing member, a linear array of spaced electrodes having tips in close proximity with said printing member, means for feeding an electrosensitive material between said printing member and said electrode tips, an array of voltage amplifier stages each including an electron discharge device and constructed to provide an output voltage of a first similar magnitude when its discharge device is conducting and of a second similar magnitude different from said first magnitude when its discharge device is non-conducting, biasing means for rendering an adjacent series of devices conductive and an adjacent series of devices non-conductive, means for varying the ratio of conductive to non-conductive devices in each series of said amplifier stage array in accord with instantaneous amplitude level variations of a voltage to be recorded, and separate current supplying means connected between said printing member and each electrode, each current supplying means being connected to be energized only by a difference in voltage between the output voltages of a respective adjacent pair of amplifier stages.

3. Apparatus for recording high frequency voltage variations comprising a plurality of electrodes having tips at spaced points along a line, means for feeding an electrosensitive recording material adjacent said tips, a plurality of current supplying channels each including a respective one of said electrodes, a plurality of voltage amplifier stages each including an electron discharge device and constructed to provide an output voltage of a first similar magnitude when its discharge device is conducting and of a second similar magnitude different from said first magnitude when its discharge device is non-conducting, means for biasing said discharge devices in an increasing biasing amplitude sequence so that a series of sequentially biased devices are conducting while the remaining series of sequentially biased devices are non-conducting, means for varying the general biasing level of all said devices in accord with the amplitude variations of a voltage to be recorded, and separate current control means in each channel and each operative in response to the differential voltage between the output voltages of a respective pair of amplifier stages having sequentially biased discharge devices.

SOOREN E. GAMAREKIAN.

References Cited in the file of this patent

UNITED STATES PATENTS

| Number | Name | Date |
|---|---|---|
| 2,262,468 | Percival | Nov. 11, 1941 |
| 2,272,070 | Reeves | Feb. 3, 1942 |
| 2,303,472 | Johnston | Dec. 1, 1942 |
| 2,405,397 | Bedford | Aug. 6, 1946 |
| 2,458,599 | Hussey | Jan. 11, 1949 |
| 2,464,353 | Smith | Mar. 15, 1949 |
| 2,469,837 | Mohr | May 10, 1949 |
| 2,485,730 | Griffen et al. | Oct. 25, 1949 |
| 2,501,791 | Silverman | Mar. 28, 1950 |
| 2,596,118 | Bischoff et al. | May 13, 1952 |